Jan. 3, 1939. R. B. WAKELEY 2,142,738
SHEARS
Filed May 17, 1937
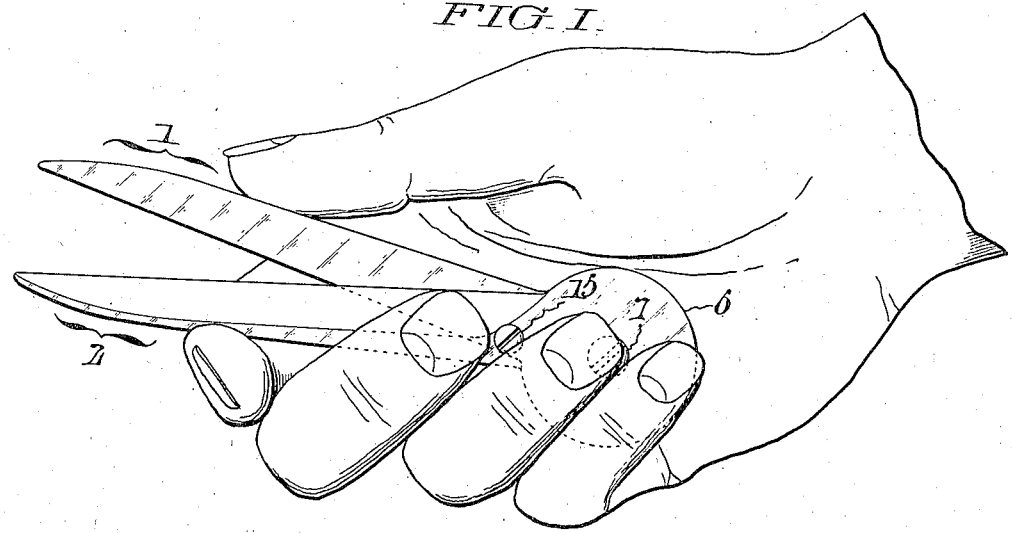
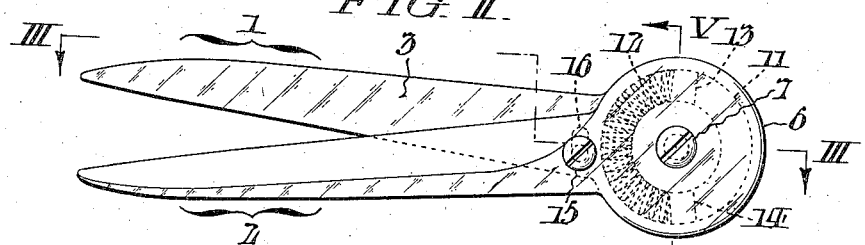
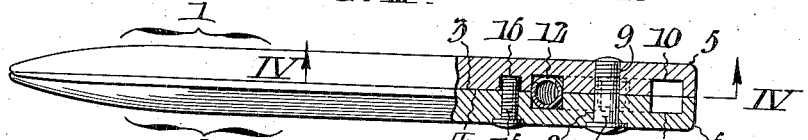
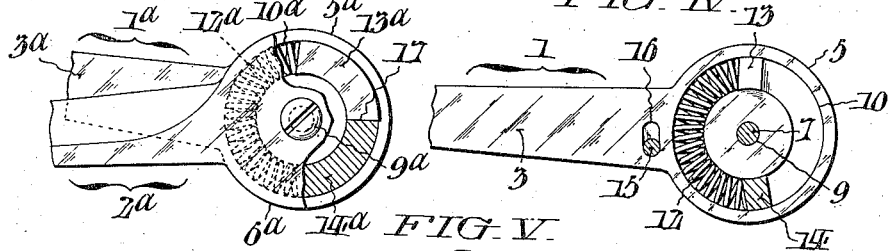
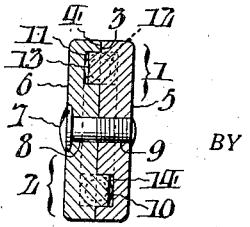
WITNESSES:
Thomas W. Kerr, Jr.
William Bell, Jr.
INVENTOR:
Robert B. Wakeley,
BY Fraley Paul
ATTORNEYS.

UNITED STATES PATENT OFFICE 2,142,738

SHEARS

Robert B. Wakeley, Philadelphia, Pa., assignor of one-half to Charles F. Emberger, Philadelphia, Pa.

Application May 17, 1937, Serial No. 142,985

3 Claims. (Cl. 30—253)

This invention relates to shears, and it has more especial reference to hand shears of a type particularly useful to weavers in cutting projecting thread ends incident to the weaving of cloth in the looms.

The chief aim of my invention is to provide shears of the kind specifically referred to which are compact for fitment into the palm of the hand for convenience of manipulaton of its blades between the thumb and forefinger; which are devoid of any projections such as would be likely to cause injuries to the hand by pinching or otherwise; and which, moreover, are conducive to ready manufacture at comparatively small cost.

Other objects and attendant advantages will appear from the following detailed description of the attached drawing, wherein Fig. I is a view showing how my improved shears are intended to be used.

Fig. II shows the shears in side elevation.

Fig. III is a longitudinal edge view of the shears with the pivot portion in section, taken as indicated by the arrows III—III in Fig. II.

Fig. IV is a fragmentary longitudinal sectional view of the shears through the meeting plane of its blade components, taken as indicated by the arrows IV—IV in Fig. III.

Fig. V is a cross sectional view through the pivot axis taken as indicated by the arrows V—V in Fig. II; and Fig. VI is a fragmentary view corresponding to Fig. II showing a modified form of my invention with a portion of the blade component nearest the observer broken away.

With more detailed reference first to Figs. I–V of these illustrations, the species of my invention there depicted comprises a pair of blade components 1 and 2 which are exact counterparts of each other, and which have mutually contacting plane inner surfaces 3, 4, and which are formed at one end with complemental circular heads 5 and 6 respectively. As shown the components 1 and 2 are pivotally connected by a headed pivot pin or screw 7 whereof the shank passes freely through a transverse axial hole 8 in the head 6 of the component 2 and threadedly engages a tapped axial hole 9 in the head 5 of component 1. Complemental segmental recesses 10 and 11 respectively in the opposing inner faces of the heads 5 and 6 jointly provide a closed hollow for confinement of a segmented helical spring 12 which is relied upon to yieldingly urge the blades apart as shown in Figs. I and II. At circumferentially spaced points, the heads 5 and 6 are respectively formed with lug projections 13 and 14. From Figs. IV and V it will be noted that the lug projection 13 of blade component 1 extends into the circular recess 11 of the blade component 2 and one end thereof serves as an abutment for one end of spring 12, while the lug projection 14 of blade component 2 extends into the recess 10 of component 1 with the corresponding end thereof serving as an abutment for the other end of said spring. A screw 15 fast in the blade component 2 has its shank projecting beyond the inner surface 4 of said component and reaching into a segmental recess 16 in the inner surface of the blade component 1 for capacity to coact with the latter as a stop means whereby the opening movement of the blades, under the action of the spring 12, is definitely limited.

As shown in Fig. I, the shears are so proportioned as to fit into the palm of the hand with cutting ends of the blades conveniently accessible for manipulation respectively by the thumb and forefinger. Aside from their simplicity of construction, it will be apparent from the foregoing that the shears of my invention are unique by virtue of their being entirely devoid of any protrusions by which the skin could be pinched or otherwise injured.

In the modification of Fig. VI, the lugs 13a and 14a are circumferentially extended so that their contiguous ends meet as shown at 17 to serve as a stop means in lieu of a screw stop such as featured at 15 in the first described embodiment. In all other respects the modification is exactly like the first form. In order therefore to dispense with the necessity for repetitive description, all corresponding parts have been designated by the same reference numerals previously employed with addition, however, in each instance, of the letter "a" for the purpose of ready distinction.

Having thus described my invention, I claim:

1. Shears comprising a pair of integral opposing counterpart blade components with continuous side edges throughout their lengths, each blade being formed at one end with a swivel head which is externally flush with the blade and which has a central transverse pivot bore and a recess in its inner face in concentric relation with the bore; a pin passing through the transverse bores of the heads to pivotally connect the blade components; and means within the closed cavity jointly formed by the recesses in the opposing faces of the heads for yieldingly maintaining the blade components in open position.

2. Shears comprising a pair of blade components arranged in opposing relation, each blade component having transverse pivot bore at one end thereof and a segmental recess in its inner face in concentric relation with the bore; a pin passing through the transverse bores to pivotally connect the blade components; and a segmented helical spring confined within the closed segmental cavity jointly formed by the recess in the opposing forms of the blade components to yieldingly urge the blades apart, one end of the spring bearing against a lug which projects from one blade component into the recess of the other blade component, and the other end of said spring bearing against a similarly-arranged lug on the last mentioned blade component.

3. Shears comprising a pair of blade components arranged in opposing relation, each blade component having a transverse bore at one end and a segmental recess in its inner face in concentric relation with the bore; a pin passing through said transverse bores to pivotally connect the blade components; a segmented helical spring confined within the closed segmental cavity jointly formed within the recesses, one end of the spring bearing against one end of a segmental lug which projects from one blade component into the recess of the other blade component, and the other end of said spring bearing against the corresponding end of a similarly arranged segmental lug on the last mentioned blade component, thereby normally keeping the opposite ends of the two lugs in contact with the blade components in open position.

ROBERT B. WAKELEY.